Feb. 7, 1967    J. G. WRIGHT ETAL    3,302,945
FASTENER LOCATING MEANS
Filed July 28, 1964    3 Sheets-Sheet 1
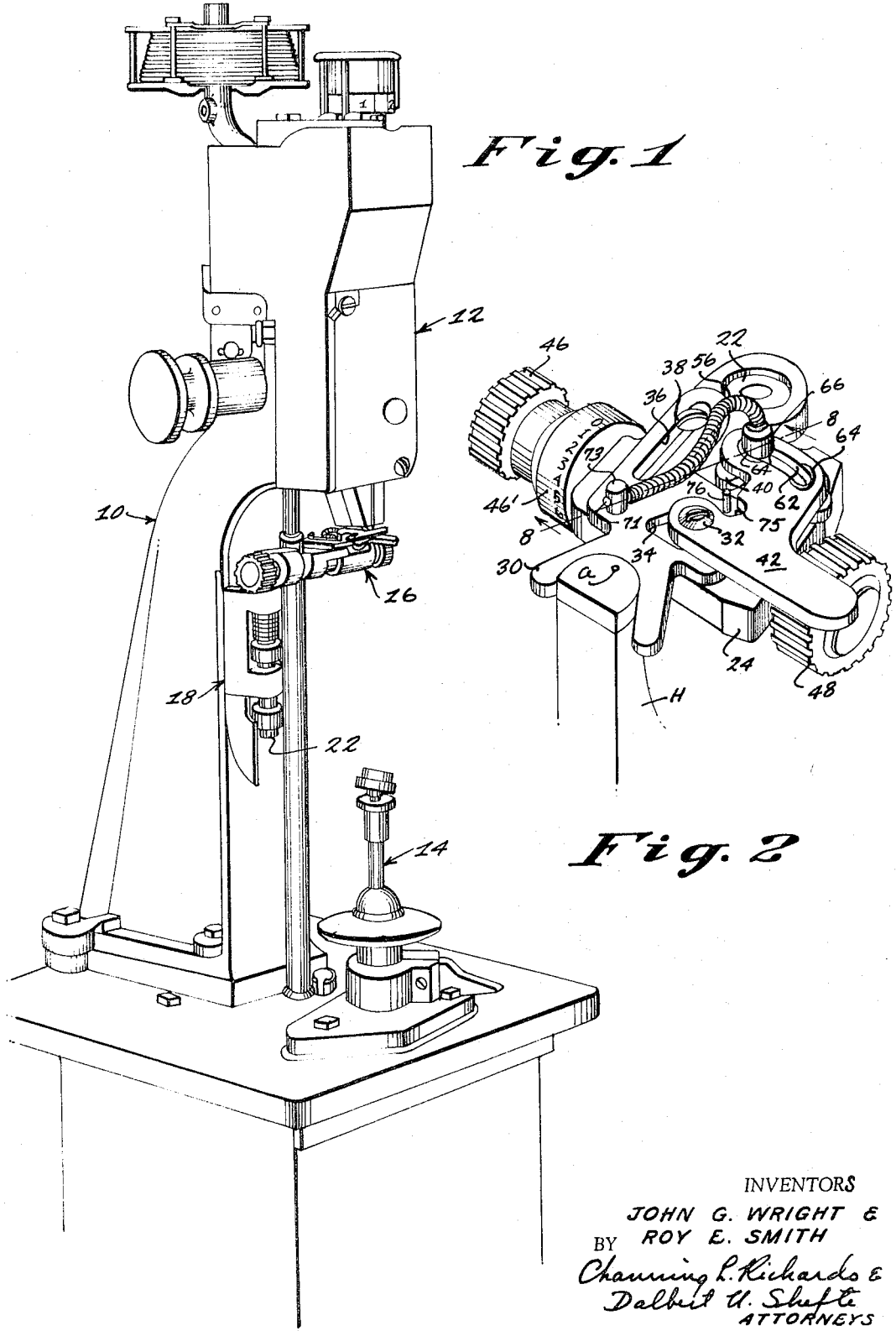
INVENTORS
JOHN G. WRIGHT &
BY ROY E. SMITH
Channing L. Richards &
Dalbert U. Shefte
ATTORNEYS Feb. 7, 1967  J. G. WRIGHT ETAL  3,302,945
FASTENER LOCATING MEANS
Filed July 28, 1964  3 Sheets-Sheet 2

INVENTORS
JOHN G. WRIGHT &
ROY E. SMITH
BY
Channing L. Richards &
Dalbert U. Shefte
ATTORNEYS United States Patent Office 3,302,945
Patented Feb. 7, 1967

3,302,945
FASTENER LOCATING MEANS
John G. Wright and Roy E. Smith, Atlanta, Ga., assignors to The Auto-Soler Company, a corporation of Georgia
Filed July 28, 1964. Ser. No. 385,650
5 Claims. (Cl. 269—317)

This invention relates generally to means for positioning work in relation to a machine operation, and more particularly to adjustable means of this sort arranged for locating work of varying sizes properly for insertion of a plurality of fasteners therein, with selective provision for maintaining the plurality of fastener insertion points spaced within a given limited area regardless of the adjusted setting of the work positioning means, while allowing the fastener insertion spacing otherwise to vary in accordance with the adjusted setting required by the size of the work.

The means thus provided according to the present invention is an elaboration of the device disclosed and claimed in U.S. Patent No. 3,017,635, issued January 23, 1962, and is characterized particularly by the association of an auxiliary latch means with the basic structure described in that prior patent so that the fastener insertion point spacing may be optionally maintained within a given limited area as mentioned above.

Such optional limiting of the fastener insertion point spacing is especially significant and advantageous in relation to the replacement of top lifts on ladies shoes that have a heel block fitted with a core of relatively small diameter in which the fasteners for attaching the top lift must be inserted, and the invention is described in further detail below in relation to an embodiment arranged for this purpose as illustrated by the accompanying drawings, in which:

FIG. 1 is a perspective view showing generally the arrangement of a fastener forming and inserting machine with work guiding means embodying the present invention provided in relation thereto;

FIG. 2 is an enlarged perspective illustration of the guide means;

Figure 3:
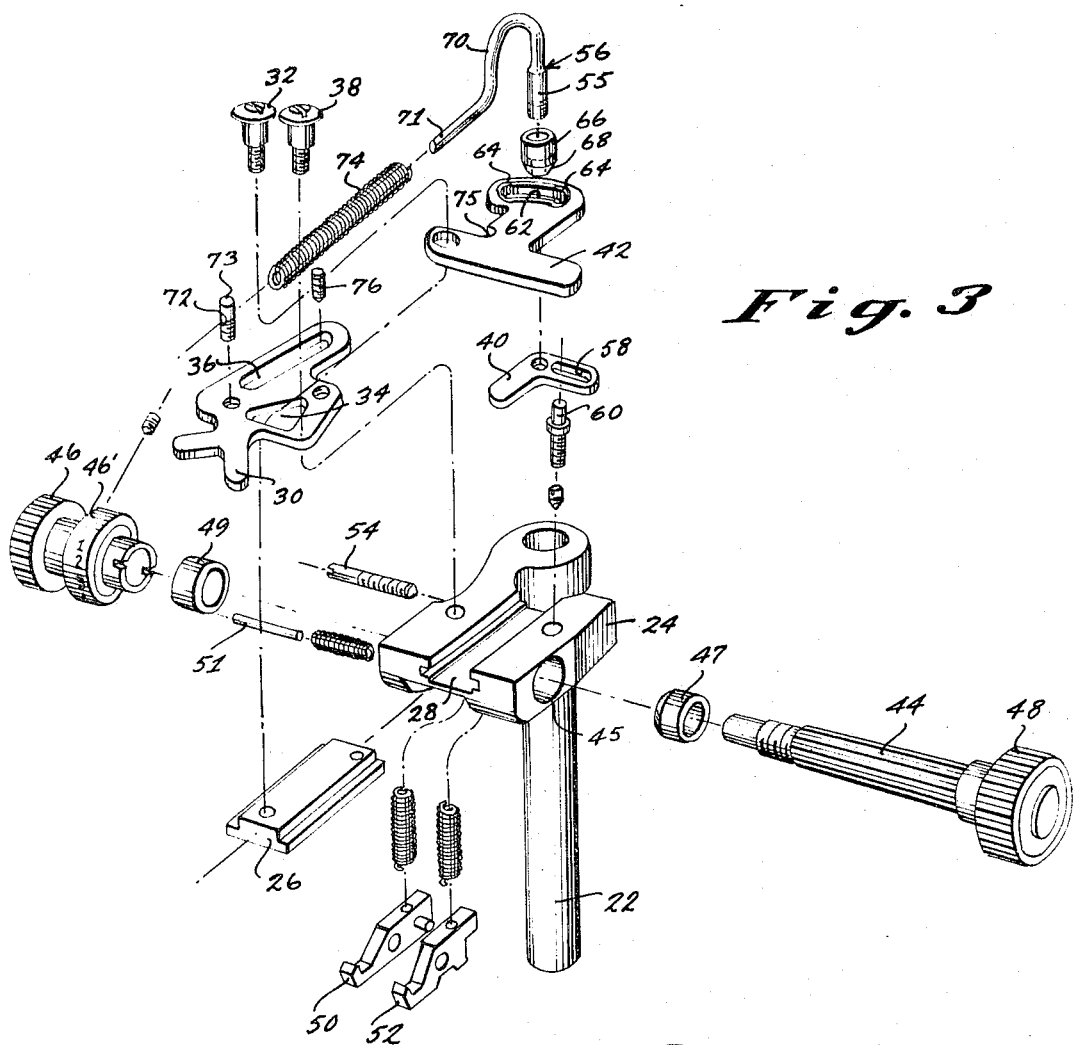
FIG. 3 is an exploded perspective illustration of the various guide means elements.
Figure 8:
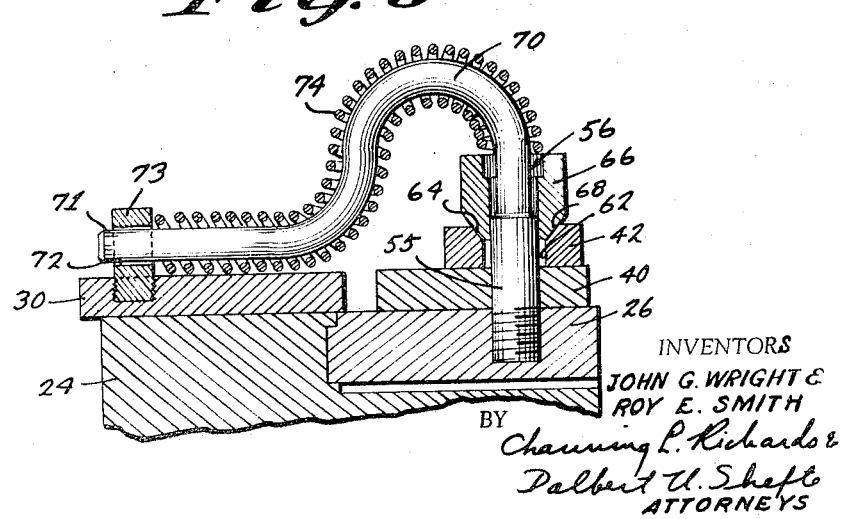
FIG. 8 is detail taken at line 8—8 in FIG. 2 illustrating the biasing arrangement for the work guiding means of the present invention.

Referring now in detail to the drawings, FIG. 1 indicates generally the arrangement of a fastener forming and inserting machine of the type disclosed, for example, in U.S. Patent No. 2,698,681, in which a frame structure 10 supports an operating head 12 disposed for inserting fasteners downwardly into work supported by supporting structure 14 and having guide means 16 according to the present invention mounted for positioning the work with respect to the operating head 12 to determine the location at which the fasteners are inserted.

The guide means 16 of the present invention, as in the previously mentioned U.S. Patent No. 3,017,635, includes a mounting arrangement generally indicated by reference numeral 18 to hold the guide means 16 selectively at an active position with respect to the operating head 12 and to apply a turning bias upon release of a pivoted locking lever to swing the guide means 16 to an inactive position when not to use, all as described at length in U.S. Patent No. 2,986,737.

The mounting arrangement 18 includes a pivot stud 22 on which is fitted a support bracket member 24 having a slide member 26 carried in an undercut groove 28 therein for movement along a rectilinear path. A work guiding member 30 is supported through lost motion connections formed respectively by a screw 32 extending through a triangular aperture 34 and engaged in slide member 26, and by an elongated slot 36 in a lateral portion of the guiding member 30 that is arranged normally to extend in spaced parallel relation at one side of the groove 28, with a screw 38 extending therethrough and anchored in the support member 24 to form a guide stud thereat. A related abutment member 40 and an auxiliary latch plate member 42 mounted in overlying relation to abutment member 40 and guiding member 30 are also attached to the slide member 26 in a manner to be described in further detail below.

The bottom face of the slide member 26 includes rack teeth (not shown) which engage a pinion shaft 44 supported in a transverse bore 45 formed in support member 24 by bearing collars 47 and 49 for adjusting selectively the position of the slide member 26 along its rectilinear axis by manipulating either of the knobs 46 or 48 provided at each end of the pinion shaft 44, one of which has an indicating scale 46' for selecting a particular adjusted setting of the slide member 26 indicated by pointer 51, while a pair of pawl members 50 and 52 are mounted on a pivot pin 54 for engagement with the pinion shaft 44 to hold the slide member 26 at a given adjusted setting, all as described in further detail in the above-noted U.S. Patent No. 3,017,635.

The previously mentioned abutment member 40 is mounted on slide member 26 rearwardly of the guiding member 30 by the adjacent end 55 of a rod member 56 to thereby pivot the abutment member 40 intermediate its length, and one end of the abutment member 40 has a slot 58 formed therein through which extends a guide stud 60 secured in the support member 24 for forming a further lost motion connection thereat; the guide stud 60 being formed eccentrically with respect to the threaded shank thereof to provide phase adjustment of the lost motion connection of the related abutment member 40 as described in further detail in U.S. Patent No. 3,017,635.

The overlying auxiliary latch plate member 42 is pivotally mounted with respect to the support member 24 and the guiding member 30 by screw 32 and includes a slot 62 which is arcuate with respect to its pivot axis and which has ends 64 countersunk in the top surface of latch plate 42 through which the end portion 55 of rod member 56 extends to guide the latch plate 30 between first and second pivoted positions determined by the arcuate length of the slot 62; the first position being the extreme clockwise position and the second position being the extreme counter-clockwise position of the latch plate 42. A collar member 66 is slidably mounted on the rod member 56 and has a chamfered end portion 68 adapted to correspond in shape with the countersunk ends 64 of the arcuate slot 62. The rod member 56 includes a reduced portion 70 having a gooseneck configuration by which the end 55 extends in right angle relation to the end 71 which is slidably received at a lateral aperture 72 in a stud member 73 secured to the guiding member 30. A compression spring 74 is disposed around the reduced portion 70 and acts to bias the chamfered end 68 of collar member 66 into yieldable seating engagement with the countersunk end portions 64 of guide slot 62 to maintain the latch plate member 42 selectively at the first and second positions, and for reaction at stud member 73 to maintain the guiding member 30 biased against shifting with respect to support member 24. The latch plate 42 also has a notch 75 formed therein for engagement with a projecting pin 76 secured to the guiding member 30; the notch 75 being proportioned in lost motion relation to pin 76 corresponding to the fastener insertion point spacing that latch plate 42 is to maintain when it is in its second position (FIG. 5); and the notch 75 will be clear of the pin 76 when the latch plate 42 is in its first position to permit normal movement of the guiding member 30 (FIG. 4) as will be described in further detail below.

Figure 7:
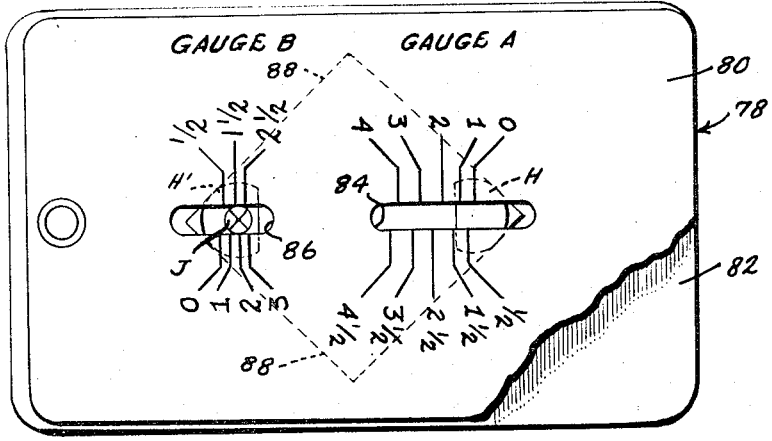
FIG. 7 is an enlarged plan detail and illustration of the indicator scale setting gage.

FIG. 7 shows an indicator scale gage 78 composed of a top plate 80 and a bottom plate 82 arranged so that the two slots 84 and 86 in the top plate will expose two corners of a square opening 88 in the bottom plate 82. Each of the slots has a different calibration, the slot 84 being calibrated to indicate the proper setting for the indicating scale 46′ of guide means 16 when a heel without a core is to be repaired, and the slot 86 is calibrated to indicate the proper setting for a heel having a core portion. To use the slot 84 or "Gauge A," the heel H is placed under the top plate 80 and in abutting relation thereto with the circular or rearward portion of the heel H abutting two of the side walls of the square opening 88 so that the breast of the heel H will form a straight line across slot 84 and perpendicular to the center line thereof as shown in FIG. 7. The proper setting for the indicating scale 46′ is determined by the calibration line which is closest to the straight line formed by the breast of heel H which, in FIG. 7, would be "1½." To use slot 86 or "Gauge B," and heel H′ having a core portion J is placed under the slot 86 in the same manner as with "Gauge A," but the proper setting for indicating scale 46′ is determined by the calibration line nearest the center of the core portion J which, in FIG. 7, would be "2." Although the two heels H and H′ are identical in outside dimensions, the cored heel H′ would have a different setting for the indicating scale 46′ then would the regular heel H.

Figures 4, 5, 6:
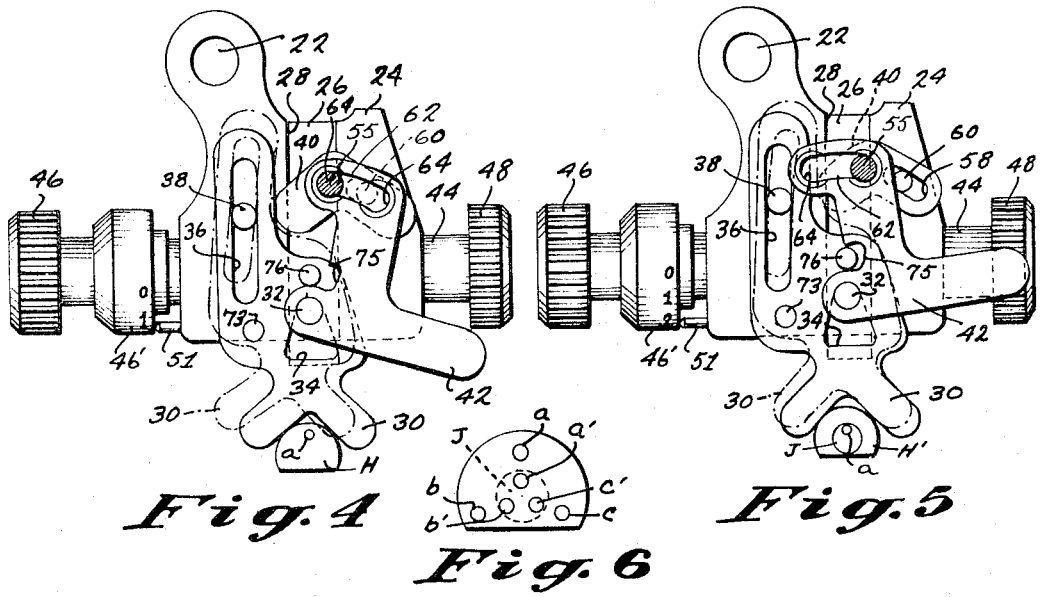
FIG. 4 is a plan detail of the guide means showing the latch plate in a position disengaged from the guide member.
FIG. 5 is a further plan detail corresponding generally to FIG. 4 but showing the latch plate in an engaged position.
FIG. 6 is an enlarged related plan detail illustrating the fastener insertion pattern when the latch plate is engaged and disengaged.

As arranged in the above-described manner, the operation of the guiding member 30 and the auxiliary latch plate 42 is illustrated representatively in FIGS. 4 through 6 of the drawings. In FIG. 4, the latch plate 42 is shown in its first position with the notch 75 clear of the pin 76 thereby to permit normal movement of the guiding member 30 permitted by related abutment member 40 and by its lost motion connection with the support member 24 as determined by the initial setting of scale 46′ at "1½" in accordance with the reading on "Gauge A"; the full lines illustrating the unshifted position of the guiding member 30 at which the fastener a would be inserted into heel block H, and by the dotted lines illustrating a retracted position of the guiding member 30 at which the heel H would then be located properly for insertion of the right forward fastener c (FIG. 6). The left forward fastener b would be inserted in a similar manner by rearward manual pressure of the heel H directed toward the right as seen in FIG. 4. For heels of different sizes, of course, the reading of "Gauge A" will indicate different settings for scale 46′ and by manipulating the knobs 46 and 48, the pinion shaft 44 adjusts the position of slide member 26 to a series of different settings to adjust selectively the initial (i.e., full line) extended position of the guiding member 30 as well as to adjust the position of related abutment member 42 which is articulated with respect to the guiding member 30 for proportionately following the degree of extension thereof to limit in like proportion the selective shifting of guiding member 30 so that the plurality of fastener inserting points are spaced in accordance with the degree of extension selected. The settings are such that the spacing between insertion points is smallest at the lowest number on scale 46′ where the slide 26 is at its greatest extension.

As indicated by FIG. 6, however, the pattern of fastener insertions resulting from the "Gauge A" guide setting and the latch plate 42 being in its first position would not fall within the smaller area of a core J indicated by dotted lines. Therefore, when a heel of the cored type is to be repaired, the operator readjusts the setting of scale 46′ to correspond with the reading of "Gauge B" (i.e., "2") and pivots the latch plate 42 in a counter-clockwise direction until it is in its second position such that the notch 75 is located adjacent the pin 76 as illustrated in FIG. 5. The resetting of the indicating scale 46′ to a higher setting causes the guiding member 30 to move inwardly and the heel H is so positioned that the initial fastener insertion will be made at a′, within the core J as illustrated by the full lines in FIG. 5. The notch 75 of latch plate 42 limits the relative movement of the guide member 30 as it is moved rearwardly to its retracted position such that the right forward insertion c′ (dotted lines) and the left forward insertion b′ will be made at points spaced from each other and from the point of insertion a′ so that all of the insertions are within the confines of the core J. This fastener insertion point spacing is determined, of course, by the design of the notch 75 and is always uniform when the latch plate 42 is at its second or operative position regardless of the setting of the work guiding member 30 whereby all of the insertion points will fall within a similar core located in any size heel by an initial setting determined by "Gauge B."

Although it is to be understood that the notch 75 may be designed to give any particular insertion point spacing desired, the spacing maintained by the latch plate 42 of the illustrated embodiment corresponds to the spacing normally afforded at the greatest extension of the guiding member 30 and is uniform through all lesser degrees of extension.

The present invention has been described in detail above for purposes of illustration only and is not intended to be limited by the description or otherwise except as defined in the appended claims.

We claim:

1. In a work positioning device, for a fastener inserting machine, comprising a support member, a work guiding member selectively extensible from said support member and selectively shiftable with respect thereto for locating a plurality of fastener insertion points in a spaced pattern at a selected extension thereof, and related means on said support member articulated with respect to said work guiding member for proportionately following the degree of extension thereof from said support member to limit in like proportion the selective shifting thereof so that said plurality of fastener insertion points are spaced in accordance with the degree of extension selected, the improvement which comprises an auxiliary latch means carried for following the extensible movement of said work guiding member and shiftable with respect thereto between a first inoperative position allowing the spacing of said plurality of fastener insertion points to be determined normally by said related means and a second operative position at which said auxiliary latch means engages said work guiding member to maintain the fastener insertion point spacing afforded at a greater extension of said member uniform through all lesser degrees of extension thereof.

2. In a work positioning device, the improvement defined in claim 1 and further characterized in that said uniform fastener insertion point spacing corresponds to the spacing afforded at the greatest extension of said member.

3. In a work positioning device, the improvement defined in claim 2 and further characterized in that said auxiliary latch means comprises a lever pivoted for shifting between said first and second positions and having a notch formed therein for engaging said work guiding member at said second position.

4. In a work positioning device, the improvement defined in claim 3 and further characterized in that said work guiding member is fitted with a projecting pin element for engagement by said auxiliary latch means at the notch formed therein, and in that said notch is proportioned in lost motion relation to said pin element corresponding to the fastener insertion point spacing that is to be maintained thereby.

5. In a work positioning device, the improvement defined in claim 4 and further characterized: in that the articulation of said related means with respect to said work guiding member comprises a slide member carrying said work guiding member shiftably on said support member, a rod element having a gooseneck configuration adjacent one end portion by which said adjacent end portion is caused to extend right angularly with respect to the other end portion thereof and which adjacent end portion is anchored in said slide member as a pivot axis for said related means, a laterally apertured stud element fitted to said work guiding member and slidably receiving the other end portion of said rod element at the lateral aperture therein, and a compression spring disposed on said rod element for reaction at said stud element to maintain said work guiding member biased against shifting with respect to said support member; and said improvement being additionally characterized in that said auxiliary latch member is disposed in overlying relation with respect to said work guiding member and said related means and is slotted arcuately in relation to its pivot axis at a radius locating said slot for riding the adjacent end portion of said pin element above said related means, the arcuate length of said slot determining the extent to which said auxiliary latch means shifts between said first and second positions, the top face of said latch means being countersunk at each end of said slot to define said first and second positions, and a collar member being slidably disposed on said pin element at said adjacent end portion under the bias of said compression spring and with the facing end thereof chamfered for yieldably seating at the countersunk ends of said slot to maintain said auxiliary latch means selectively at said first and second positions.

References Cited by the Examiner

UNITED STATES PATENTS 3,017,635 1/1962 Wright _____ 269—319
3,083,368 4/1963 Wright et al. _____ 269—319

ROBERT C. RIORDON, *Primary Examiner.*

J. F. McKEOWN, *Assistant Examiner.*